United States Patent
Harada et al.

(10) Patent No.: US 11,240,770 B2
(45) Date of Patent: Feb. 1, 2022

(54) TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 56 days.

(21) Appl. No.: 16/637,072

(22) PCT Filed: Aug. 10, 2017

(86) PCT No.: PCT/JP2017/029221
§ 371 (c)(1),
(2) Date: Feb. 6, 2020

(87) PCT Pub. No.: WO2019/030927
PCT Pub. Date: Feb. 14, 2019

(65) Prior Publication Data
US 2020/0245270 A1    Jul. 30, 2020

(51) Int. Cl.
*H04W 56/00* (2009.01)
*H04B 17/318* (2015.01)
(Continued)

(52) U.S. Cl.
CPC ........ *H04W 56/001* (2013.01); *H04B 17/318* (2015.01); *H04B 17/336* (2015.01);
(Continued)

(58) Field of Classification Search
CPC ... H04W 56/001; H04W 24/10; H04W 76/27; H04W 72/046; H04B 17/318; H04B 17/336
See application file for complete search history.

(56) References Cited

U.S. PATENT DOCUMENTS

| | | | |
|---|---|---|---|
| 11,064,448 B2* | 7/2021 | Pajukoski | ........... H04W 56/001 |
| 2010/0284294 A1* | 11/2010 | Salzer | .................. H04B 7/0452 |
| | | | 370/252 |

(Continued)

FOREIGN PATENT DOCUMENTS

| EP | 2453595 A1 * | 5/2012 | ........... H04B 17/318 |
|---|---|---|---|
| EP | 2996378 A1 | 3/2016 | |
| EP | 3389319 A1 * | 10/2018 | ............ H04W 56/00 |

OTHER PUBLICATIONS

International Search Report issued in PCT/JP2017/029221 dated Oct. 31, 2017 (1 page).

(Continued)

*Primary Examiner* — Deepa Belur
(74) *Attorney, Agent, or Firm* — Osha Bergman Watanabe & Burton LLP

(57) ABSTRACT

A terminal is disclosed including a receiver that measures a first received power in a first resource of a synchronization signal per synchronization signal block index in a cell, and measures a second received power in a second resource; and a processor that derives a measurement result based on a ratio of the first received power to the second received power per the synchronization signal block index. In other aspects, a radio communication method for a terminal is also disclosed.

16 Claims, 16 Drawing Sheets

(51) Int. Cl.
*H04B 17/336* (2015.01)
*H04W 76/27* (2018.01)
*H04W 24/10* (2009.01)
*H04W 72/04* (2009.01)

(52) U.S. Cl.
CPC ......... *H04W 24/10* (2013.01); *H04W 72/046* (2013.01); *H04W 76/27* (2018.02)

(56) References Cited

U.S. PATENT DOCUMENTS

| | | | |
|---|---|---|---|
| 2015/0264592 A1 | 9/2015 | Novlan et al. | |
| 2016/0105265 A1 | 4/2016 | Wang et al. | |
| 2019/0319686 A1* | 10/2019 | Chen, IV | H04W 48/20 |
| 2019/0327743 A1* | 10/2019 | Shi | H04L 1/0044 |
| 2020/0169896 A1* | 5/2020 | Li | H04B 17/318 |

OTHER PUBLICATIONS

Written Opinion of the International Searching Authority issued in PCT/JP2017/029221 dated Oct. 31, 2017 (3 pages).
LG Electronics; "Discussion on RRM measurement in NR"; 3GPP TSG RAN WG1 NR Ad-Hoc Meeting, R1-1700466; Spokane, USA; Jan. 16-20, 2017 (6 pages).
Nokia et al.; "Cell selection/reselection basics for NR IDLE"; 3GPP TSG-RAN WG2 Meeting #98, R2-1704295; Hangzhou, China; May 15-19, 2017 (9 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Russian Application No. 2020107322/07; dated Oct. 20, 2020 (12 pages).
3GPP TSG-RAN WG1 #89ah-NR; R1-1711019 "On the use of SS for beam management" Ericsson; Qingdao, China; Jun. 27-30, 2017 (4 pages).
3GPP TSG-RAN WG1#88; R1-1703162 "Beam Management—Beam Reporting" Nokia, Alcatel-Lucent Shanghai Bell; Athens, Greece; Feb. 13-17, 2017 (5 pages).
3GPP TSG RAN WG1#89; R1-1708237 "SS block RSRP measurements" Nokia, Alcatel-Lucent Shanghai Bell; Hangzhou, P.R. China; May 15-19, 2017 (4 pages).
3GPP TSG RAN WG1 Meeting NR#2; R1-1710272 "SS block based RRM measurement" LG Electronics; Qingdao, P.R. China; Jun. 27-30, 2017 (5 pages).
3GPP TSG-RAN WG2 Meeting #97; R2-1701678 "UE Beam Selection for derivation of Cell Level Quality in NR" NEC; Athens, Greece; Feb. 13-17, 2017 (3 pages).
3GPP TSG-RAN WG2 NR Adhoc #2; R2-1706490 "On the role of beam-related content in NR measurement reporting" Nokia, Alcatel-Lucent Shanghai Bell; Qingdao, China; Jun. 27-29, 2017 (3 pages).
3GPP TSG-RAN WG4 Meeting NR#2; R4-1706755 "Discussion on signal quality measurements for NR" CMCC; Qingdao, China; May 27-29, 2017 (4 pages).
Office Action issued in Korean Application No. 10-2020-7006217; dated Feb. 24, 2021 (12 pages).
Extended European Search Report issued in European Application No. 17921287.3, dated Mar. 1, 2021 (12 pages).

* cited by examiner

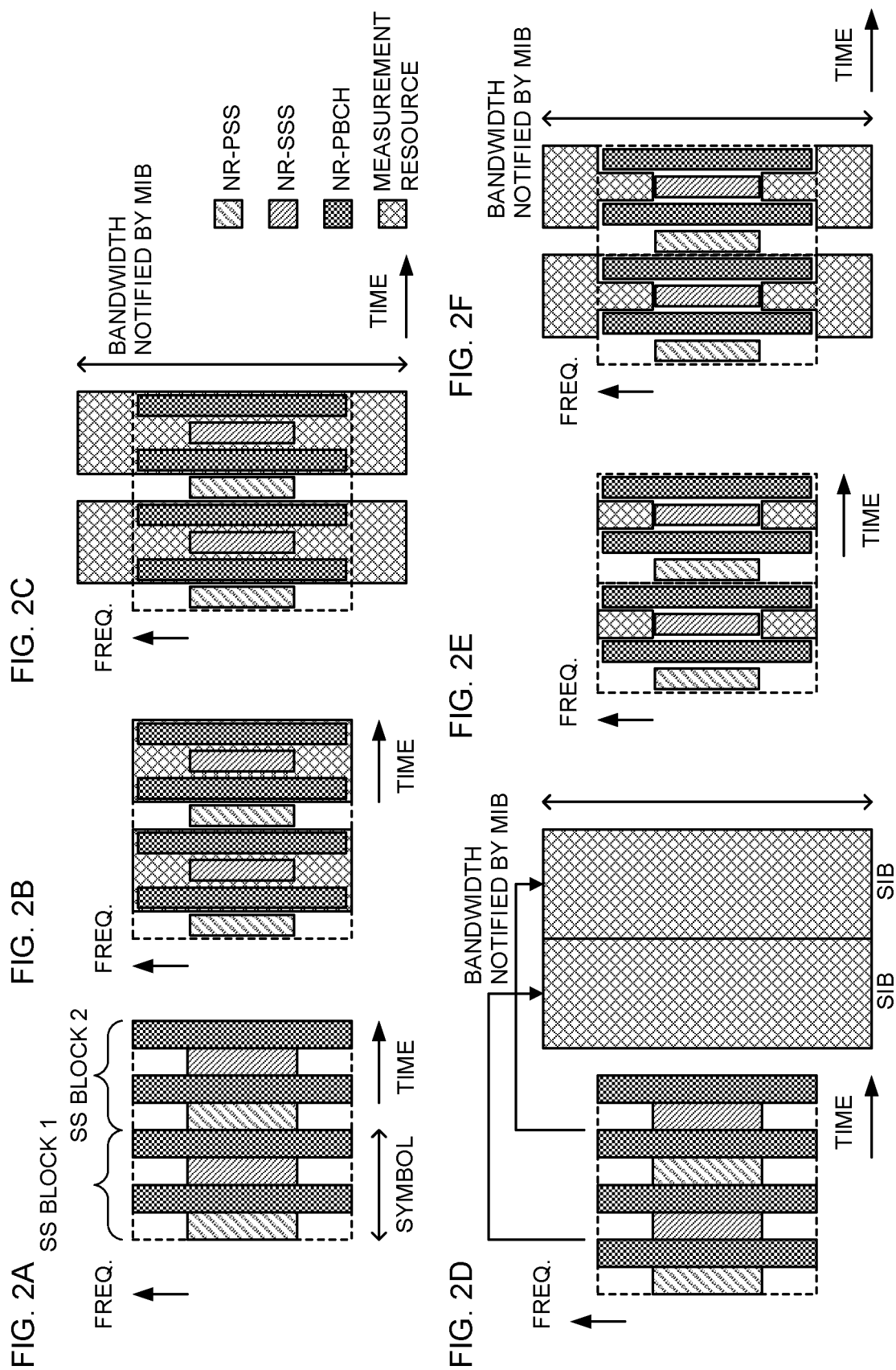

FIG. 9A

RSRP BASED ON SS BLOCK

|  | BEAM LEVEL RSRP | CELL LEVEL RSRP |
|---|---|---|
| DIRECT MEASUREMENT | ✓ |  |
| DERIVE |  | ✓ |

FIG. 9B

RECEPTION STRENGTH BASED ON SS BLOCK

|  | BEAM LEVEL RECEPTION STRENGTH | CELL LEVEL RECEPTION STRENGTH |
|---|---|---|
| DIRECT MEASUREMENT | ASPECT 1-1, 1-2 | ASPECT 2-2 |
| DERIVE |  | ASPECT 2-1 |

FIG. 9C

RECEIVED QUALITY BASED ON SS BLOCK

|  | DIRECTLY MEASURED BEAM LEVEL RSRP | DERIVED CELL LEVEL RSRP |
|---|---|---|
| DIRECTLY MEASURED BEAM LEVEL RECEPTION STRENGTH ACCORDING TO ASPECT 1-1 OR 1-2 | ASPECT 1-4 | ASPECT 2-4-b |
| DIRECTLY MEASURED CELL LEVEL RECEPTION STRENGTH ACCORDING TO ASPECT 2-2 | ASPECT 2-4-a |  |
| DERIVED CELL LEVEL RECEPTION STRENGTH ACCORDING TO ASPECT 2-1 | ASPECT 2-4-a |  |

TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified, and LTE successor systems (also referred to as, for example, Future Radio Access (FRA), the 5th generation mobile communication system (5G), New Radio (NR), New radio access (NX), Future generation radio access (FX) or LTE Rel. 13, 14, 15 or subsequent releases) have been also studied.

LTE Rel. 10/11 have introduced Carrier Aggregation (CA) that aggregates a plurality of carriers (Component Carriers (CCs)) to obtain a wider band. A system band of LTE Rel. 8 is one unit that composes each CC. Furthermore, according to CA, a plurality of CCs of the identical radio base station (also referred to as, for example, an eNB (eNodeB) or a Base Station (BS)) are configured to a user terminal (UE: User Equipment).

On the other hand, LTE Rel. 12 has introduced Dual Connectivity (DC), too, that configures a plurality of Cell Groups (CGs) of different radio base stations to UEs. Each cell group includes at least one cell (CC). Therefore, DC aggregates a plurality of CCs of the different radio base stations, and therefore DC is also referred to as Inter-base station CA (Inter-eNB CA).

Furthermore, LTE Rel. 8 to 12 have introduced Frequency Division Duplex (FDD) for performing Downlink (DL) transmission and Uplink (UL) transmission at different frequency bands, and Time Division Duplex (TDD) for temporarily switching downlink transmission and uplink transmission in the same frequency band.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and NR) are expected to realize various radio communication services while meeting respectively different request conditions (e.g., an ultra high speed, a large volume and ultra low latency).

For example, it has been studied for 5G/NR to provide radio communication services that are referred to as enhanced Mobile Broad Band (eMBB), massive Machine Type Communication (mMTC), and Ultra Reliable and Low Latency Communications (URLLC).

Furthermore, LTE defines that a UE measures and reports received quality. However, NR does not define how to measure received quality. When received quality is not appropriately measured, there is a risk of deterioration of a communication throughput.

The present invention has been made in light of this point, and one of objects of the present invention is to provide a user terminal and a radio communication method that can appropriately measure received quality.

Solution to Problem

A user terminal according to one aspect of the present invention includes: a reception section that receives a given signal in one or more synchronization signal blocks; and a measurement section that measures first received power of the given signal, and second received power of a radio resource associated with the one or more synchronization signal blocks, and the measurement section derives received quality of a cell based on the first received power and the second received power.

Advantageous Effects of Invention

According to the present invention, it is possible to appropriately measure received quality.

BRIEF DESCRIPTION OF DRAWINGS

FIGS. 2A to 2F are diagrams illustrating one example of a measurement resource for beam level reception strength measurement.

FIGS. 9A to 9C are diagrams illustrating one example of a relationship between a first embodiment and a second embodiment.

DESCRIPTION OF EMBODIMENTS

Figure 1:
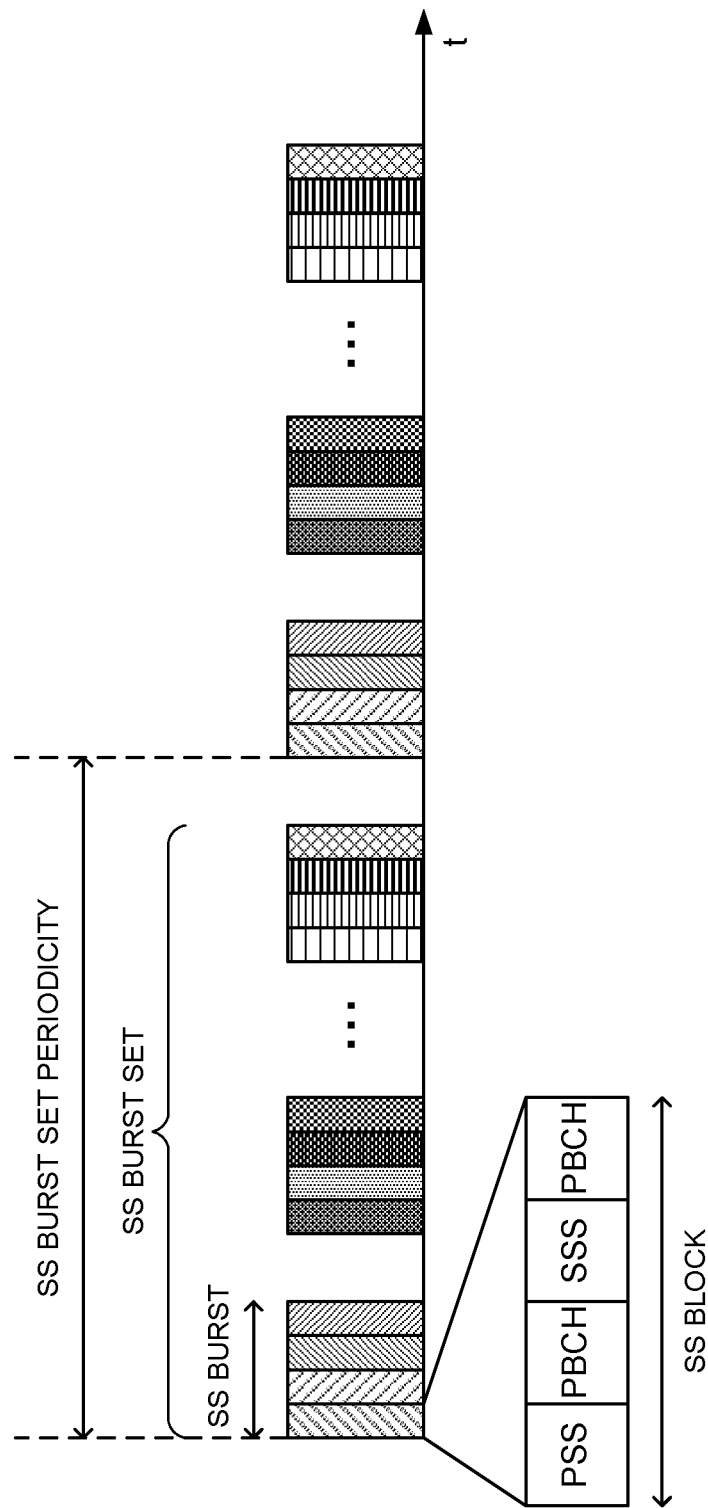
FIG. 1 is a conceptual explanatory diagram of an SS block.

According to legacy LTE, a UE supports intra-frequency measurement of measuring a connected serving carrier, and inter-frequency measurement of measuring a non-serving carrier different from the serving carrier. According to the intra-frequency measurement and the inter-frequency measurement, at least one of Reference Signal Received Power (RSRP), a Received Signal Strength Indicator (RSSI) and Reference Signal Received Quality (RSRQ) of a target carrier is measured.

The RSRP is defined as a linear average (power per resource element) of a power contribution [W] of a resource element that carries a Cell-specific Reference Signal (CRS) in a given frequency bandwidth. When a higher layer instructs measurement based on a discovery signal, the UE measures the RSRP in a subframe in a configured discovery signal occasion. A reference point for the RSRP is an antenna connector of the UE.

The RSRQ is defined as NxRSRP/RSSI. In this regard, N represents the number of Resource Blocks (RBs) of an RSSI measurement bandwidth. A numerator (RSRP) and a denominator (RSSI) are measured over the same set of resource blocks.

The RSSI is a linear average of transmission/received power [W] observed only in a certain OFDM symbol of a measured subframe in a measurement bandwidth over N RBs by the UE from all signal sources including a serving cell and a non-serving cell between a channel, a neighboring channel interference and thermal noise.

If the higher layer does not instruct other resources, the RSSI is measured only from an OFDM symbol including a reference symbol for an antenna port 0 of the measured subframe. When the higher layer instructs all OFDM symbols in response to execution of RSRQ measurement, the RSSI is measured from all OFDM symbols of a DL part of the measured subframe. When the higher layer instructs a certain subframe in response to execution of RSRQ measurement, the RSSI is measured from all OFDM symbols of the DL part of the instructed subframe.

When the higher layer instructs measurement based on a discovery signal, the UE measures an RSSI in a subframe in a configured discovery signal occasion.

A reference point for the RSRQ is an antenna connector of the UE.

The UE in a connection mode (a connected state or RRC_CONNECTED) may measure a Reference Signal-Signal to Noise and Interference Ratio (RS-SINR). The RS-SINR is defined as a value obtained by dividing a linear average of the power contribution [W] of a resource element that carries the CRS by the linear average of the power contribution [W] of noise plus an interference over a resource element that carries the CRS in the same frequency bandwidth. A reference point for the RS-SINR is an antenna connector of the UE. In addition, the RS-SINR will be referred to simply as an SINR.

Furthermore, an RSSI Measurement Timing Configuration (RMTC) for Licensed-Assisted Access (LAA) is defined. The UE configures the RMTC according to configured parameters. The parameters include a periodicity, a subframe offset and a measurement time. According to the RMTC, it is possible to flexibly configure resources compared to a configuration of the RSSI for the RSRQ to measure and report the RSSI.

By the way, it is studied for future radio communication systems (e.g., LTE Rel. 14, 15 and subsequent releases such as 5G and NR that will be referred to as NR below) to define a resource unit including a synchronization signal and a broadcast channel as a Synchronization Signal (SS) block (an SS block, a synchronization signal block or an SS/Physical Broadcast Channel (PBCH) block), and make initial connection based on the SS block.

FIG. 1 is a conceptual explanatory diagram of an SS block. The SS block includes at least a PSS for NR (NR-PSS), an SSS for NR (NR-SSS) and a PBCH for NR (NR-PBCH) that can be used for the same use as a Primary Synchronization Signal (PSS), a Secondary Synchronization Signal (SSS) and a PBCH of legacy LTE systems. In addition, a Tertiary Synchronization Signal (TSS) different from the PSS and the SSS may be included in the SS block.

The NR-PBCH may include broadcast information, and a Demodulation Reference Signal (a DMRS or a PBCH DMRS) for demodulation of the broadcast information.

The length of the SS block is, for example, a plurality of OFDM symbols. In this example, the PSS of one symbol, the SSS of one symbol and the PBCHs of two symbols are subjected to Time Division Multiplexing (TDM). The PSS and the SSS, or the PSS and the PBCHs may be subjected to Time Division Multiplexing (TDM) or may be subjected to Frequency Division Multiplexing (FDM).

A set of one or a plurality of SS blocks may be referred to as an SS burst. In this example, the SS burst includes a plurality of temporarily contiguous SS blocks, yet is not limited to this. For example, the SS burst may include SS blocks of contiguous frequency and/or time resources or may include SS blocks of non-contiguous frequency and/or time resources.

The SS burst is preferably transmitted per given periodicity (that may be referred to as an SS burst periodicity). Alternatively, the SS burst may not be transmitted per periodicity (or may be transmitted aperiodically). An SS burst length and/or an SS burst periodicity may be transmitted in a period such as one or a plurality of subframes or one or a plurality of slots.

The SS burst may include a plurality of SS blocks.

Furthermore, one or a plurality of SS bursts may be referred to as an SS burst set (SS burst series). For example, a base station (that may be also referred to as a Base Station (BS), a Transmission/Reception Point (TRP), an eNodeB (eNB) or a gNB) and/or the UE may beam-sweep and transmit a plurality of SS blocks by using one or more SS bursts included in one SS burst set.

In addition, the SS burst set is preferably transmitted periodically. The UE may control reception processing assuming that the SS burst set is transmitted periodically (at an SS burst set periodicity). The SS burst set periodicity may be a default value (e.g., 20 ms) or may be notified by higher layer signaling from a Network (a NW such as a base station).

For NR, a scenario (multibeam scenario) that a cell includes a plurality of beams is studied. In addition, the "beam" may be read as a "resource", a "space resource" or an "antenna port". A plurality of different SS blocks may be each transmitted by using a plurality of different base station transmission beams (transmission beams). The different SS blocks may each include information indicating a different SS block index or beam index.

Furthermore, the multibeam scenario takes into account that the UE measures and reports received quality of a beam level (per base station transmission beam) for selecting an appropriate base station transmission beam (or a combination of the base station transmission beam and a UE received beam). Furthermore, the multibeam scenario takes into account that the UE measures and reports received quality of a cell level (per cell) for appropriately selecting a cell.

It is studied for NR to measure RSRP (first received power) based on the SS block. Furthermore, it is studied to measure RSRP (beam level RSRP or SS block RSRP) per base station transmission beam and RSRP (cell level RSRP or cell quality) per cell by transmitting each of a plurality of SS blocks by using a plurality of base station transmission beams.

At least the SSS may be used to measure the beam level RSRP. When the UE knows a power offset between a PBCH DMRS and the SSS, the PBCH DMRS may be used to measure the beam level RSRP. A fixed power offset defined by a specification may be employed for the SSS and the PBCH DMRS per frequency band. Furthermore, it is studied to measure the RSRP by taking this beam forming gain into account when the UE applies a received beam.

The cell level RSRP may be derived from N higher beams. In this regard, N may be configured to one or more by higher layer signaling. When the number of beams is larger than one, averaging may be used to derive the cell level RSRP from a plurality of beams.

That is, the beam level RSRP may be directly measured, and the cell level RSRP may be derived based on the beam level RSRP.

According to NR, the RSRQ based on the SS block may be used for intra-frequency measurement and inter-frequency measurement of the UE in the idle mode (the idle state or RRC_IDLE) and the UE in the connection mode (RRC_CONNECTED).

However, a definition and measurement of the RSSI based on the SS block are not determined. For example, which UE received beam (a received beam or an Rx beam) is used for measurement, which one of the beam level RSSI to be measured or the cell level RSSI to be measured or derived is used, which resource is used for measurement, and whether or not the same or different UE measuring operation is performed in a serving cell, neighboring cells or other carriers are unknown.

Furthermore, a definition of the RSRQ based on the SS block is not determined. For example, which one of the beam level RSRQ and the cell level RSRQ is used is unknown.

According to NR, the RS-SINR based on the SS block may be used for intra-frequency measurement and inter-frequency measurement of the UE in the idle mode and the UE in the connection mode.

However, similar to the RSSI, a definition and measurement of noise plus an interference are not determined. For example, which UE received beam is used for measurement, noise plus an interference of a beam level to be measured, which one of noise plus an interference of a cell level to be measured or derived is used, and which resource is used for measurement are unknown.

Furthermore, similar to the RSRQ, a definition of the RS-SINR based on the SS block is not determined. For example, which one of the beam level RS-SINR and the cell level RS-SINR is used is unknown.

Hence, the inventors have studied a method for deriving received quality (e.g., RSRQ or an RS-SINR) based on the SS block, and have arrived at the present invention.

More specifically, how to measure a beam level reception strength based on the SS block is defined. Furthermore, how to derive beam level received quality based on the beam level reception strength is defined. Furthermore, how to derive cell level received quality based on the beam level received quality is defined.

Furthermore, how to measure or derive the cell level reception strength based on the SS block is defined. Furthermore, how to derive cell level received quality based on the cell level reception strength is defined.

In the following description, the reception strength (second received power) may be the RSSI, and the received quality may be the RSRQ. In this case, the beam level reception strength may be the beam level RSSI, the beam level received quality may be the beam level RSRQ, the cell level reception strength may be the cell level RSSI, and the cell level received quality may be the cell level RSRQ.

In the following description, the reception strength may be noise plus an interference for the SINR, and the received quality may be the SINR. In this case, the beam level reception strength may be noise plus an interference of a beam level, the beam level received quality may be a beam level SINR, the cell level reception strength may be noise plus an interference of a cell level, and the cell level received quality may be a cell level SINR.

Furthermore, the RSSI may be read as noise plus an interference for the SINR. The RSRQ may be read as the SINR. Furthermore, a result of each base station transmission beam may be read as a result of each SS block.

In the following description, measurement of reception strength or received quality derives the reception strength or the received quality. Furthermore, when another result is not derived to obtain the reception strength or the received quality, the reception strength or the received quality is directly measured.

Embodiments according to the present invention will be described in detail below with reference to the drawings. A radio communication method according to each embodiment may be each applied alone or may be applied in combination.

(Radio Communication Method)

First Embodiment

According to the first embodiment of the present invention, a UE measures beam level reception strength (a beam level RSSI or noise plus an interference of a beam level) based on an SS block.

Following aspect 1-1 and aspect 1-2 will describe a resource (measurement resource) determining method for beam level reception strength measurement.

<<Aspect 1-1>>

The beam level reception strength measurement may be performed based on a resource known by the UE and a radio base station and defined in advance.

An OFDM symbol (time resource) defined in advance for the beam level reception strength measurement may be a symbol in an SS block. For example, the symbol to be measured may include at least one of an NR-PSS, an NR-SSS and an NR-PBCH.

The OFDM symbol defined in advance for the beam level reception strength measurement may be a symbol of a System Information Block (SIB) associated with the SS block. The SIB symbol may be notified in a Master Information Block (MIB) in the NR-PBCH in each SS block. For example, the MIB may indicate a Physical Downlink Control Channel (PDCCH) in a common search space corresponding to the SIB, and/or a PDCCH corresponding to a Physical Downlink Shared Channel (PDSCH) including the SIB similar to Control Resource Set (CORESET) information. The CORESET is a frame (that is alternatively referred to as a box, a set or a mass) of a resource on which DL control information is mapped, or a time resource and/or a frequency resource in which the PDCCH is accommodated.

A measurement resource for measuring the noise plus the interference for an SINR may have a narrower bandwidth than a resource element of a reference signal in a symbol to be measured. The reference signal described herein may be at least one of the NR-PSS, the NR-SSS and an NR-PBCH DMRS, or may be at least one of a PDCCH DMRS and a PDSCH DMRS.

A bandwidth (frequency resource) defined in advance for the beam level reception strength measurement may be a default bandwidth according to a specification. For example, this bandwidth may be the same as the bandwidth of the NR-PBCH or the SS block.

The bandwidth defined in advance for the beam level reception strength measurement may be updated based on a bandwidth notified by the MIB and/or the SIB. For example, this bandwidth may be wider than the bandwidth of the SS block.

According to NR, a symbol and a bandwidth for measurement may be fixed.

Furthermore, NR may support a plurality of different types among a plurality of measurement resource types described above, and the UE may determine a measurement resource of a serving cell from a plurality of types. For example, the UE may determine the measurement resource of the serving cell based on detection of SS blocks of neighboring cells. The SS blocks of the neighboring cells may be aligned or collide. Furthermore, the UE may determine the measurement resource of the serving cell based on an implementation of the UE. Furthermore, the UE in an idle mode may determine the measurement resource of the serving cell based on a notification from the radio base station in the MIB and/or the SIB. Furthermore, the UE in a connection mode may determine the measurement resource of the serving cell based on RRC signaling.

FIGS. 2A-2F and 3A-3D are diagrams illustrating one example of a measurement resource for the beam level reception strength measurement. FIG. 2A illustrates configurations of an SS block 1 and an SS block 2, and FIGS. 2B to 2F and 3A to 3D illustrate examples of a measurement resource for the SS block 1 and a measurement resource for the SS block 2.

In an example 1 illustrated in FIG. 2B, the measurement resource includes symbols of the NR-SSS and the NR-PBCH, and an NR-PBCH bandwidth. In this case, although the bandwidth of the NR-SSS is narrower than the bandwidth of the NR-PBCH, the UE may measure the entire bandwidth of the NR-PBCH over symbols of the NR-SSS and the NR-PBCH.

In an example 2 illustrated in FIG. 2C, the measurement resource is updated to the symbols of the NR-SSS and the NR-PBCH and the bandwidth notified by the MIB and/or the SIB.

In an example 3 illustrated in FIG. 2D, the measurement resource is updated to a symbol of an SIB associated with the SS block notified by the MIB and a bandwidth notified by the MIB and/or the SIB.

In an example 4 illustrated in FIG. 2E, the measurement resource is a RE that does not include the symbols of the NR-SSS and the NR-PBCH in the example 1, and Resource Elements (REs) of the NR-SSS and the NR-PBCH of the NR-PBCH bandwidth.

In an example 5 illustrated in FIG. 2F, the measurement resource is a RE that does not include the symbols of the NR-SSS and the NR-PBCH in the example 2, and REs of the NR-SSS and the NR-PBCH of the bandwidth notified by the MIB and/or the SIB. That is, the bandwidth is updated by the MIB and/or the SIB.

Figure 3A:
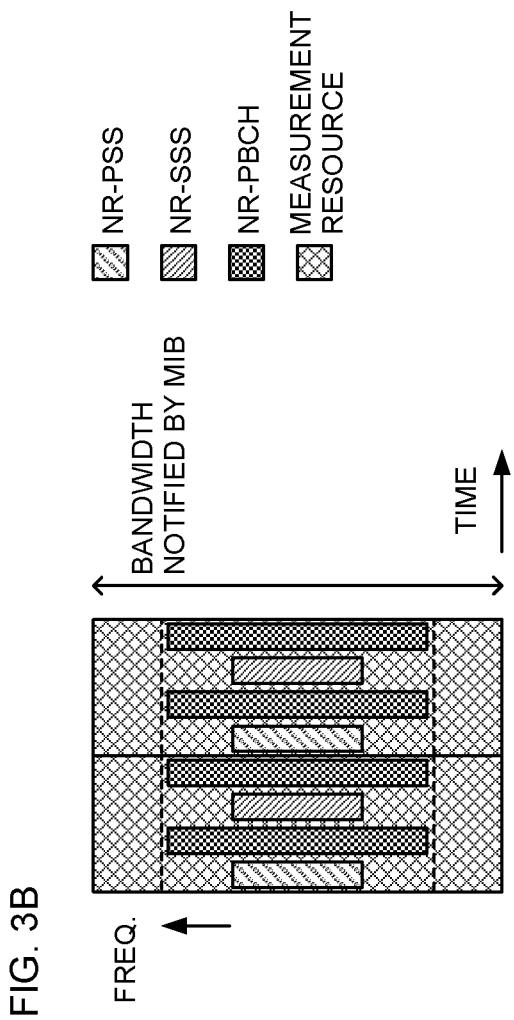
FIGS. 3A to 3D are diagrams illustrating another example of a measurement resource for beam level reception strength measurement.

In an example 6 illustrated in FIG. 3A, the measurement resource includes symbols of the NR-PSS, the NR-SSS and the NR-PBCH, and the NR-PBCH bandwidth. In this case, although the bandwidths of the NR-PSS and the NR-SSS are narrower than the bandwidth of the NR-PBCH, the UE may measure the entire bandwidth of the NR-PBCH over the symbols of the NR-PSS, the NR-SSS and the NR-PBCH.

Figure 3C:
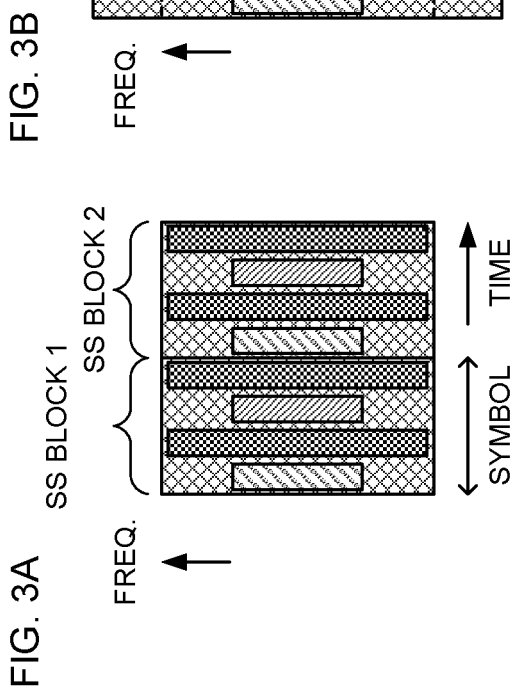
Figure 3B:
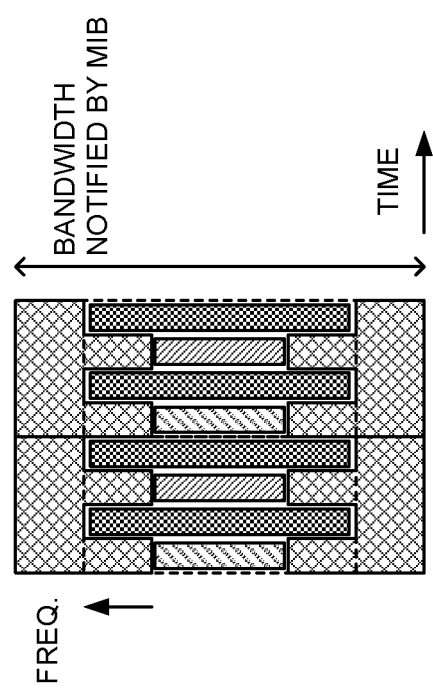

In an example 7 illustrated in FIG. 3B, the measurement resource is updated to symbols of the NR-PSS, the NR-SSS and the NR-PBCH, and a bandwidth notified by the MIB and/or the SIB.

In an example 8 illustrated in FIG. 3C, the measurement resource is a RE that does not include the symbols of the NR-PSS, the NR-SSS and the NR-PBCH in the example 6, and REs of the NR-PSS, the NR-SSS and the NR-PBCH of the NR-PBCH bandwidth.

Figure 3D:
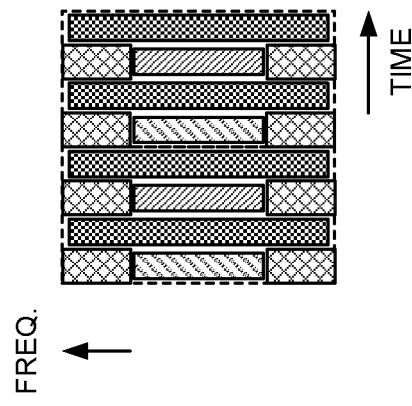

In an example 9 illustrated in FIG. 3D, the measurement resource is a RE that does not include the symbols of the NR-PSS, the NR-SSS and the NR-PBCH in the example 7, and REs of the NR-PSS, the NR-SSS and the NR-PBCH of the bandwidth notified by the MIB and/or the SIB. That is, the bandwidth is updated by the MIB and/or the SIB.

In following aspect 1-1, the measurement resource is defined in advance, and fixed by the specification. Hence, operations of the UE and the radio base station are simple. Furthermore, there is no overhead of a measurement resource configuration.

On the other hand, for example, the measurement resource is fixed in the example 1, and therefore an RSSI does not reflect an actual state. When, for example, a synchronization network transmits an SS block of another cell by a measurement resource of a certain SS block of a certain cell, an interference to be measured hardly changes irrespectively of a data traffic in another cell. By, for example, measuring reception strength of a wide band similar to the example 2 or the example 3, it is possible to deal with a problem of the example 1.

<<Aspect 1-2>>

The beam level reception strength measurement may be performed based on a resource (measurement resource) configured in association with each SS block for the serving cell.

Signaling for configuring the measurement resource to the UE in the idle mode may be an SIB. Signaling for configuring the measurement resource to the UE in the connection mode may be RRC signaling.

Parameters configured for the beam level reception strength measurement may be at least one of a measurement resource timing (e.g., an offset and/or a periodicity), a measurement resource time duration, a bandwidth, no configuration of the bandwidth (when, for example, the bandwidth of the measurement resource is not configured, the bandwidth may be the same as the bandwidth notified by the MIB), numerologies, no configuration of the numerologies (when, for example, the numerologies of the measurement resource are not configured, the numerologies may be the same as those of other reference signals), time and/or frequency resource elements, no configuration of the time and/or frequency resource elements, and an association with each SS block (e.g., a timing offset or a Quasi Collocation (QCL)).

The numerology may be a communication parameter applied to transmission and/or reception of a certain signal and/or channel, and may indicate at least one of, for example, a Sub-Carrier Spacing (SCS), a bandwidth, a symbol length, a cyclic prefix length, a TTI length (e.g., a subframe length and a slot length), the number of symbols per TTI, a radio frame configuration, filtering processing and windowing processing.

The measurement resource configured in association with each SS block may include a corresponding SIB (e.g., Remaining Minimum System Information (RMSI) or Other System Information (OSI)), paging or a DL symbol for transmitting another channel of the serving cell.

Figure 4:
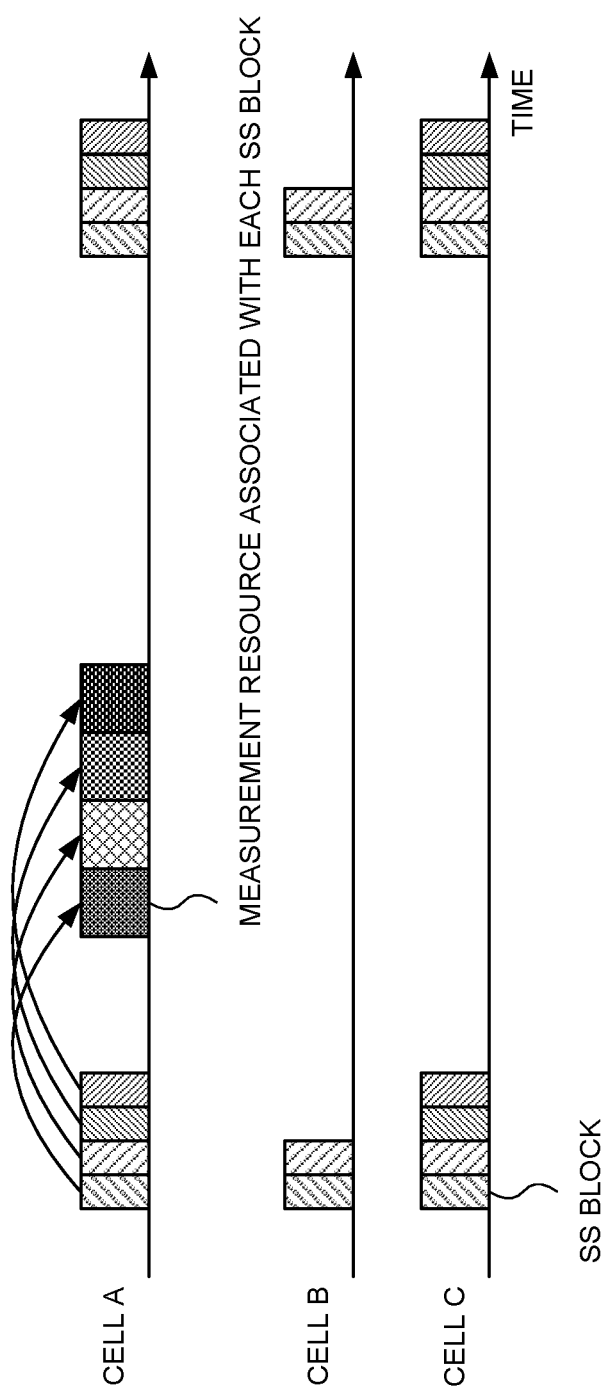
FIG. 4 is a diagram illustrating one example of a measurement resource configured in association with each SS block for beam level reception strength measurement.

FIG. 4 is a diagram illustrating one example of the measurement resource configured in association with each SS block for the beam level reception strength measurement.

A plurality of measurement resources for the beam level reception strength measurement are associated with a plurality of SS blocks, respectively, for the serving cell.

According to above aspect 1-2, the measurement resources are configured by the radio base station, and the specification defines the SIB for the UE in the idle mode and RRC signaling for the UE in the connection mode. Consequently, it is possible to flexibly configure the measurement resources. By, for example, flexibly configuring the measurement resources of reception strength, it is possible to deal with the problems in the example 1 of aspect 1-1.

On the other hand, a signaling overhead, and a configuration operation overhead are caused.

<<Aspect 1-3>>

The UE may measure beam level reception strength by using a UE received beam (received beam).

A following assumption a or assumption b can be used for the UE received beam for RSRP measurement.

Figure 5:
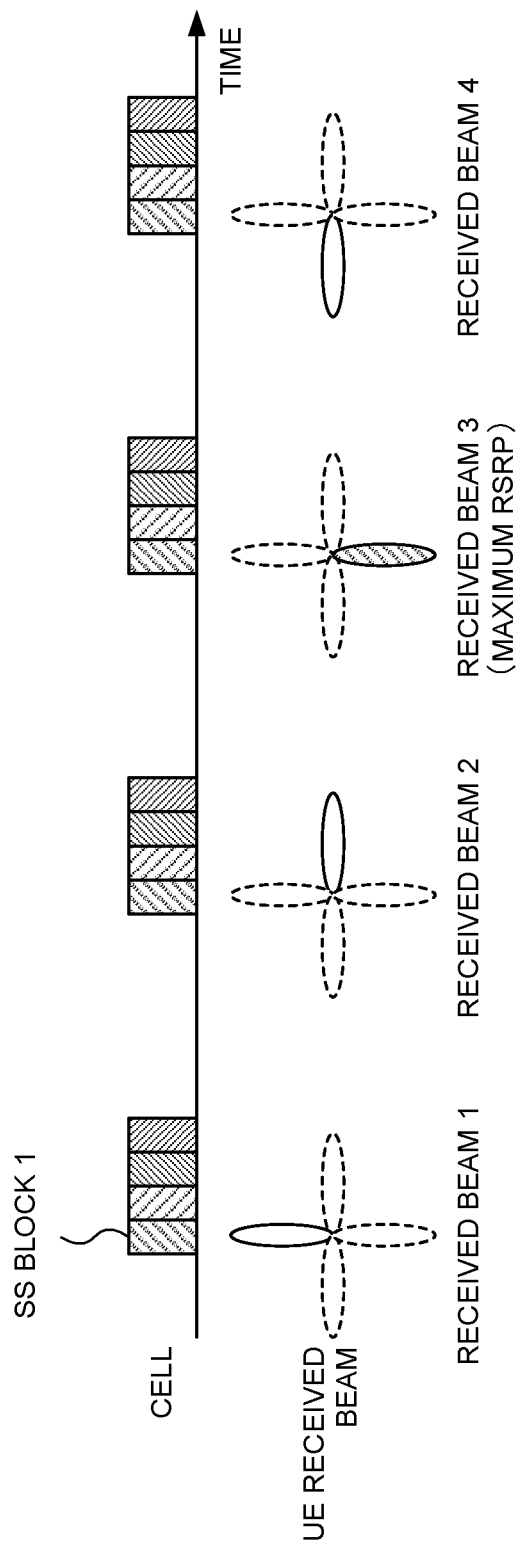
FIG. 5 is a diagram illustrating one example of an assumption a regarding a relationship between RSRP measurement and a UE received beam.

According to the assumption a, beam level RSRP may be the highest RSRP that can be obtained from a beam pair link. The beam pair link is, for example, a combination of a base station transmission beam and a UE received beam. As illustrated in FIG. 5, the UE measures the RSRP by using a plurality of UE received beams in the same SS block (same transmission beam), and determines the highest RSRP in the SS block. In an example of FIG. 5, the UE measures the RSRP by using received beams 1 to 4 in the SS block 1 of SS blocks 1 to 4, and regard this RSRP as the beam level RSRP of the SS block 1 since this RSRP corresponding to the received beam 3 is the highest.

According to the assumption b, the UE determines a UE received beam for RSRP measurement based on an implementation of the UE. For example, the UE may determine a received beam at random or may regard an average of RSRP measured by using some received beams as beam level RSRP. The UE received beam for RSRP measurement is not necessarily a UE received beam corresponding to the highest RSRP.

The UE may determine the UE received beam for beam level reception strength measurement by using a following option a or b.

The option a is beam level reception strength measurement in a case where the beam level RSRP measurement according to the assumption a is performed. By using a received beam used to measure the highest RSRP of a certain SS block, the UE measures beam level reception strength of the SS block.

The option b is beam level reception strength measurement in a case where the beam level RSRP measurement according to the assumption b is performed. The UE determines a received beam used for the beam level reception strength measurement similar to the assumption b. For example, the UE may determine a received beam at random, or may regard an average of reception strengths measured by using some received beams as beam level reception strength. A received beam used for beam level reception strength may be the same as a received beam used for beam level RSRP.

According to above aspect 1-3, even when the UE uses a plurality of received beams, it is possible to match a received beam used for beam level RSRP measurement, and a received beam used for beam level reception strength measurement, and enhance measurement accuracy. When RSRP of a certain received beam is the highest for a certain SS block, and RSRP of another received beam is the highest for another SS block, received beams are different, so that interferences are also different. Furthermore, an interference measured in a resource corresponding to a certain transmission beam, and a resource corresponding to another transmission beam are different.

<<Aspect 1-4>>

The UE may derive beam level received quality based on beam level RSRQ and beam level reception strength.

RSRQ may be calculated for each SS block from RSRP and an RSSI according to the same equation as that of LTE (e.g., RSRQ=N×RSRP/RSSI).

The beam level RSRQ may be derived from the measured beam level RSRP and the measured beam level RSSI by using this equation.

An SINR may be calculated for each SS block from the RSRP and noise plus an interference according to the same equation as that of LTE (e.g., SINR=RSRP/(noise plus an interference)).

The beam level SINR may be derived from the measured beam level RSRP and the noise plus the interference of the measured beam level by using this equation.

According to above aspect 1-4, the UE can derive the accurate beam level RSRQ or beam level SINR by using the beam level RSRP and the beam level reception strength.

<<Aspect 1-5>>

The UE may derive cell level received quality based on beam level received quality.

The cell level received quality is derived as combination of at least one beam level received quality. Hereinafter, the beam level received quality will be referred to as a beam level result, and cell level received quality will be referred to as a cell level result.

The beam level result selected for combination may be, for example, all beam level results, may be N higher beam level results, may be the highest beam level result among beam level results exceeding a threshold of an absolute value, may be the highest beam level result among beam level results within a range of a relative threshold with respect to the highest beam level result, may be N higher beam level results at maximum among beam level results exceeding the threshold of the absolute value, or may be N higher beam level results at maximum among beam level results within the range of the relative threshold with respect to the highest beam level result.

A method for combining selected beam level results may be an average of the selected beam level results or a weighted average of the selected beam level results. Beam level results obtained from a plurality of different received beams may be synthesized.

According to above aspect 1-5, the UE can derive cell level RSRQ from beam level RSRQ. Furthermore, the UE can derive a cell level SINR from a beam level SINR.

<<Relationship Between Aspect 1-1 and Aspect 1-5>>

Figure 6:
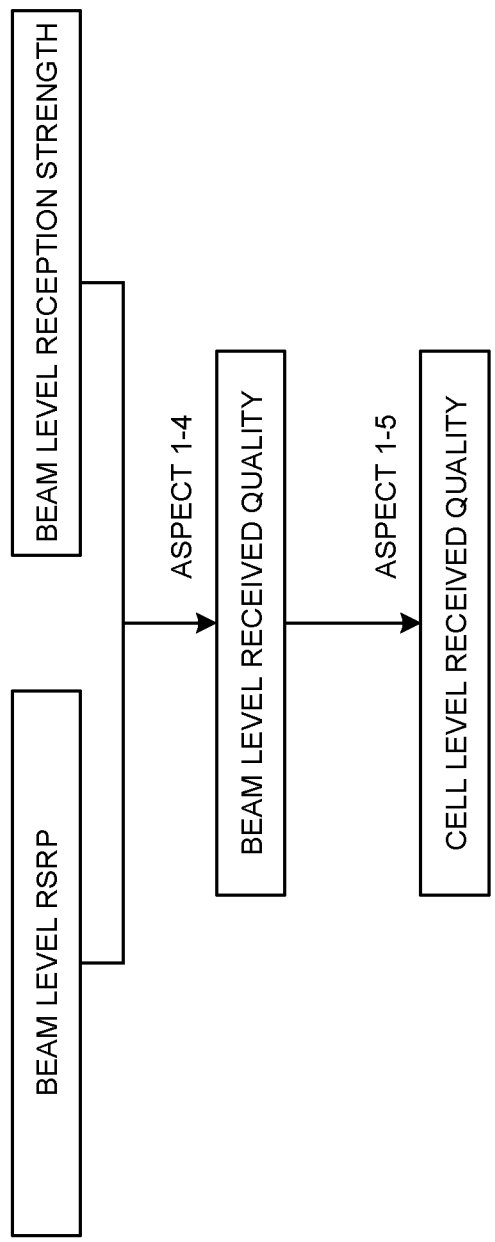
FIG. 6 is a diagram illustrating one example of a relationship between aspect 1-1 and aspect 1-5.

FIG. 6 is a diagram illustrating one example of a relationship between aspect 1-1 and aspect 1-5.

According to aspect 1-1, aspect 1-2 and aspect 1-3, the UE measures the beam level reception strength based on each SS block. According to aspect 1-1, the UE measures the beam level reception strength by using the measurement resource defined in advance. According to aspect 1-2, the UE measures beam level reception strength by using the measurement resource configured in association with each SS block. According to aspect 1-3, the UE determines the UE received beam for beam level reception strength measurement.

According to aspect 1-4, the UE derives the beam level received quality based on the beam level RSRP and the beam level reception strength.

According to aspect 1-5, the UE derives the cell level received quality based on one or more beam level received quality.

Second Embodiment

According to the second embodiment of the present invention, a UE derives or measures cell level RSRP or cell level reception strength (a cell level RSSI or noise plus an interference of a cell level).

<<Aspect 2-1>>

The UE may derive cell level reception strength based on beam level reception strength.

The UE may derive combination of some beam level reception strengths obtained from aspect 1-1 or aspect 1-2 as the cell level reception strength. Hereinafter, the beam level reception strength will be referred to as a beam level result, and the cell level reception strength will be referred to as a cell level result.

The beam level result selected for combination may be, for example, all beam level results, may be N higher beam level results, may be the highest beam level result among beam level results exceeding a threshold of an absolute value, may be the highest beam level result among beam level results within a range of a relative threshold with respect to the highest beam level result, may be N higher beam level results at maximum among beam level results exceeding the threshold of the absolute value, or may be N higher beam level results at maximum among beam level results within the range of the relative threshold with respect to the highest beam level result.

A method for combining selected beam level results may be an average of selected beam level results or a weighted average of the selected beam level results. Beam level results obtained from a plurality of different received beams may be synthesized.

According to above aspect 2-1, the UE can derive a cell level RSSI from a beam level RSSI. Furthermore, the UE can derive noise plus an interference of a cell level from noise plus an interference of a beam level.

<<Aspect 2-2>>

The UE may measure cell level reception strength.

The UE may perform the cell level reception strength measurement based on a resource (measurement resource) configured to a serving cell.

Signaling for configuring the measurement resource to the UE in the idle mode may be an SIB. Signaling for configuring the measurement resource to the UE in the connection mode may be RRC signaling.

A parameter configured for cell level reception strength measurement may be the same as that of an RMTC. For example, parameters may be at least one of a measurement resource timing (e.g., an offset and/or a periodicity), a measurement resource time duration, a bandwidth, no configuration of the bandwidth (when, for example, the bandwidth of the measurement resource is not configured, the bandwidth may be the same as the bandwidth notified by the MIB), numerologies, no configuration of the numerologies (when, for example, the numerologies of the measurement resource are not configured, the numerologies may be the same as those of other reference signals), time and/or frequency resource elements, and no configuration of the time and/or frequency resource elements.

Figure 7:
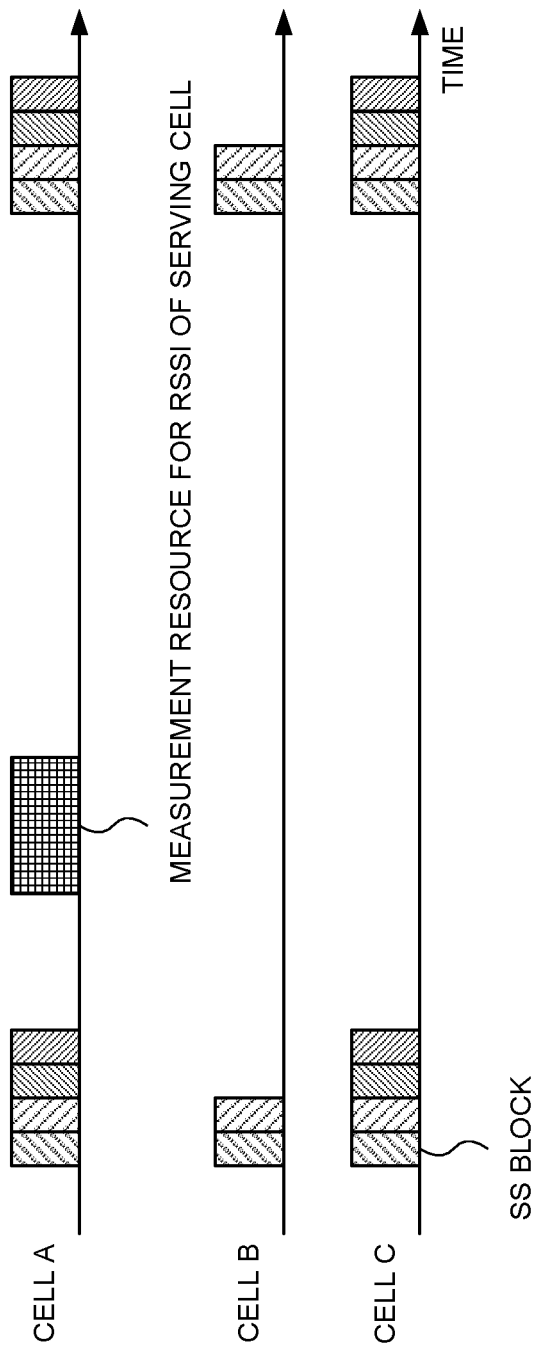
FIG. 7 is a diagram illustrating one example of cell level reception strength measurement.

FIG. 7 is a diagram illustrating one example of cell level reception strength measurement. The UE performs the cell level reception strength measurement by using measurement resources configured to all SS blocks of the serving cell.

According to above aspect 2-2, the UE can measure a cell level RSSI or noise plus an interference of a cell level. When beam level received quality is derived by using cell level reception strength that is common between all SS blocks of the serving cell, the relationship between RSRP and received quality is identical between all SS blocks, and therefore such a cell level reception strength measurement result becomes less significant. On the other hand, inter-frequency measurement of other carriers or measurement of neighboring cells is simple, so that it is possible to use cell level reception strength measurement.

<<Aspect 2-3>>

The UE may perform cell level reception strength measurement by using a UE received beam (received beam).

The UE may measure reception strength by using different received beams in an instructed resource, combine these measurement results, and obtain the cell level reception strength. A combining method may be an average.

It is not appropriate to use an option a according to aspects 1 to 3 for cell level measurement. An option b according to aspect 1-3 may be taken into account.

According to above aspect 2-3, the UE can measure a cell level RSSI, or noise plus an interference of a cell level by using a plurality of received beams.

<<Aspect 2-4>>

The UE may derive beam level received quality without using beam level RSRP or using beam level reception strength.

The UE may derive the beam level received quality by using following aspect 2-4-a or aspect 2-4-b.

According to aspect 2-4-a, the UE derives the beam level received quality based on measured beam level RSRP and measured or derived cell level reception strength. That is, the UE uses a cell level result only for reception strength.

In this case, cell level reception strength that is common between all SS blocks of the serving cell is used, and therefore the relationship between the beam level RSRP and the beam level received quality is identical between all SS blocks, and therefore aspect 2-4-a becomes less significant. On the other hand, inter-frequency measurement of other carriers or measurement of neighboring cells is simple, so that it is possible to use aspect 2-4-a.

According to aspect 2-4-b, the UE derives beam level received quality based on the derived cell level RSRP and the measured beam level reception strength. That is, the UE uses a cell level result only for RSRP.

The RSRP is not measured per beam, and therefore the option b becomes less significant.

According to above aspect 2-4, even when one of the RSRP and the reception strength is the cell level result, the UE can derive the beam level RSRQ or the beam level SINR.

<<Aspect 2-5>>

The UE may derive cell level received quality based on at least one of results according to aspect 2-1 to aspect 2-4.

The UE may derive cell level received quality by using following aspect 2-5-a or aspect 2-5-b.

According to aspect 2-5-a, the UE derives cell level received quality based on derived cell level RSRP and measured or derived cell level reception strength.

Inaccurate cell level received quality is derived based on the two derived values in some cases.

According to aspect 2-5-b, the UE derives cell level received quality based on combination of beam level received quality derived in aspect 2-4. Hereinafter, the beam level received quality will be referred to as a beam level result, and cell level received quality will be referred to as a cell level result.

The beam level result selected for the combination may be, for example, all beam level results, may be N higher beam level results, may be the highest beam level result among beam level results exceeding a threshold of an absolute value, may be the highest beam level result among beam level results within a range of a relative threshold with respect to the highest beam level result, may be N higher beam level results at maximum among beam level results exceeding the threshold of the absolute value, or may be N higher beam level results at maximum among beam level results within the range of the relative threshold with respect to the highest beam level result.

A method for combining selected beam level results may be an average of selected beam level results or a weighted average of the selected beam level results.

According to above aspect 2-5, the UE can derive the cell level RSRQ or the cell level SINR based on at least one of results according to aspect 2-1 to aspect 2-4.

<<Relationship Between Aspect 2-1 and Aspect 2-5>>

Figure 8:
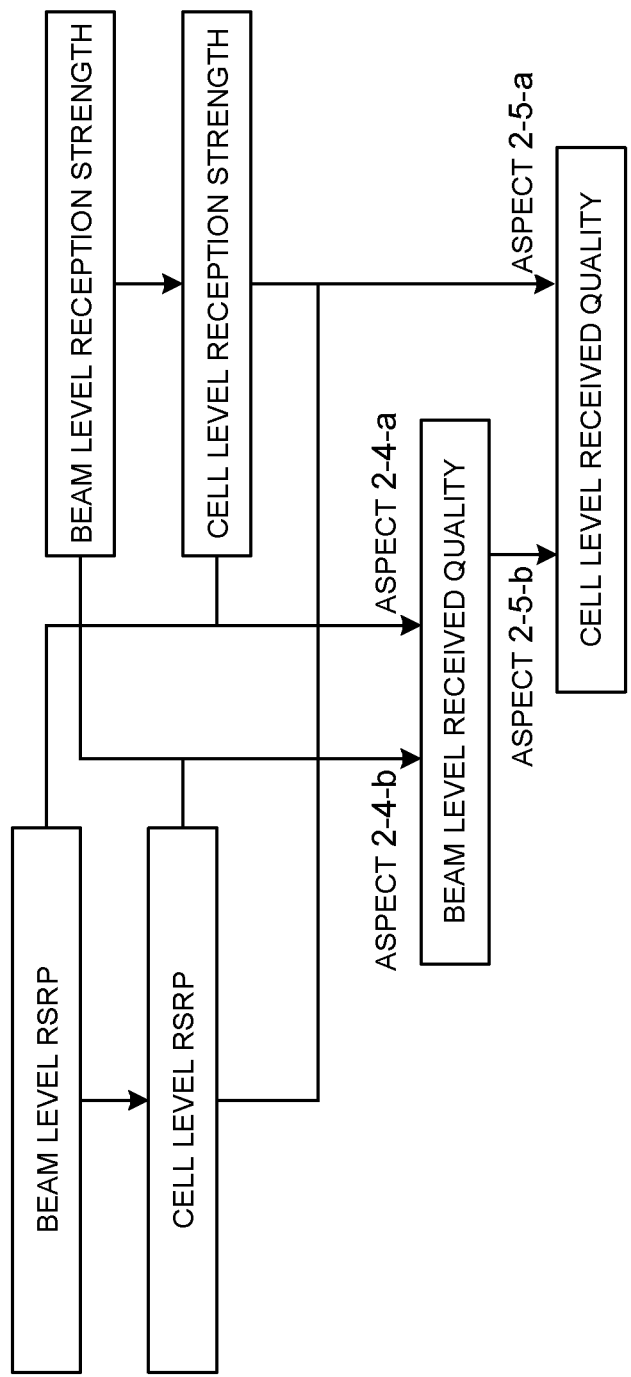
FIG. 8 is a diagram illustrating one example of a relationship between aspect 2-1 and aspect 2-5.

FIG. 8 is a diagram illustrating one example of a relationship between aspect 2-1 and aspect 2-5.

According to aspect 2-1, aspect 2-2 and aspect 2-3, the UE can measure or derive cell level reception strength. According to aspect 2-1, the UE can derive the cell level reception strength from beam level reception strength. According to aspect 2-2, the UE can measure the cell level reception strength. According to aspect 2-3, the UE can measure the cell level reception strength by using a plurality of received beams.

According to aspect 2-4-a, the UE can derive the beam level received quality based on the beam level RSRP and the cell level reception strength. According to aspect 2-4-b, the UE can derive the beam level received quality based on the cell level RSRP and the beam level reception strength.

According to aspect 2-5-a, the UE can derive the cell level received quality based on the cell level RSRP and the cell level reception strength. According to aspect 2-5-b, the UE derives the cell level received quality based on combination of the beam level received quality derived in aspect 2-4.

<<Relationship between First Embodiment and Second Embodiment>>

As illustrated in FIG. 9A, the UE may directly measure beam level RSRP based on each SS block. The UE may derive cell level RSRP based on one or more beam level RSRPs.

As illustrated in FIG. 9B, the UE may directly measure the beam level reception strength based on each SS block according to aspects 1-1 and 1-2. Similar to aspect 2-2, the UE may directly measure cell level reception strength. Similar to aspect 2-1, the UE may derive cell level reception strength.

As illustrated in FIG. 9C, according to aspect 1-4, the UE may derive beam level received quality based on measured beam level RSRP and beam level reception strength measured in aspect 1-1 or 1-2. This case can obtain the most accurate beam level received quality.

According to aspect 2-4-a, the UE may derive beam level received quality based on measured beam level RSRP and cell level reception strength measured in aspect 2-2. This case is used for inter-frequency measurement on other carriers and measurement of neighboring cells.

In aspect 2-4-a, the UE may derive beam level received quality based on measured beam level RSRP and cell level reception strength measured in aspect 2-1. This case is less significant.

According to aspect 2-4-b, the UE may derive beam level received quality based on derived cell level RSRP and beam level reception strength measured in aspect 1-1 or 1-2. This case is less significant.

The UE may derive cell level received quality based on derived cell level RSRP and measured or derived cell level reception strength. Furthermore, the UE may derive cell level received quality based on derived beam level received quality.

Other Embodiment

NR may support different types of methods for measuring (or deriving) the above-described reception strength and/or received quality. The measurement method may be configurable or may be applied to a UE according to at least one of a UE RRC state (an idle mode or a connection mode), a different purpose (e.g., intra-frequency measurement and inter-frequency measurement) and UE capability.

For example, the UE in the idle mode may use aspect 1-1 for beam level reception strength measurement, and the UE in the connection mode may use aspect 1-2 for beam level reception strength measurement.

For example, NR may configure aspect 1-2 to the beam level reception strength measurement for the serving cell, and configure aspect 2-2 for the cell level reception strength measurement for neighboring cell measurement and/or inter-frequency measurement.

For example, NR may configure aspect 1-2 to the beam level reception strength measurement for intra-frequency measurement of the serving cell and the neighboring cells on a serving carrier, and configure aspect 2-2 to the cell level reception strength measurement for inter-frequency measurement on other carriers.

Figure 10A:
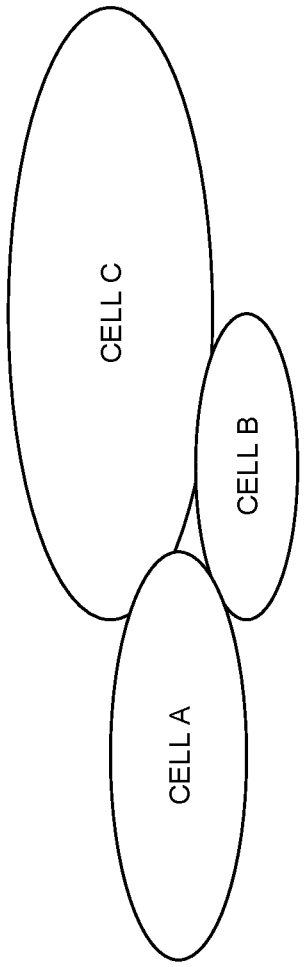
FIGS. 10A and 10B are diagrams illustrating one example of different SS burst set configurations of different cells.
Figure 10B:
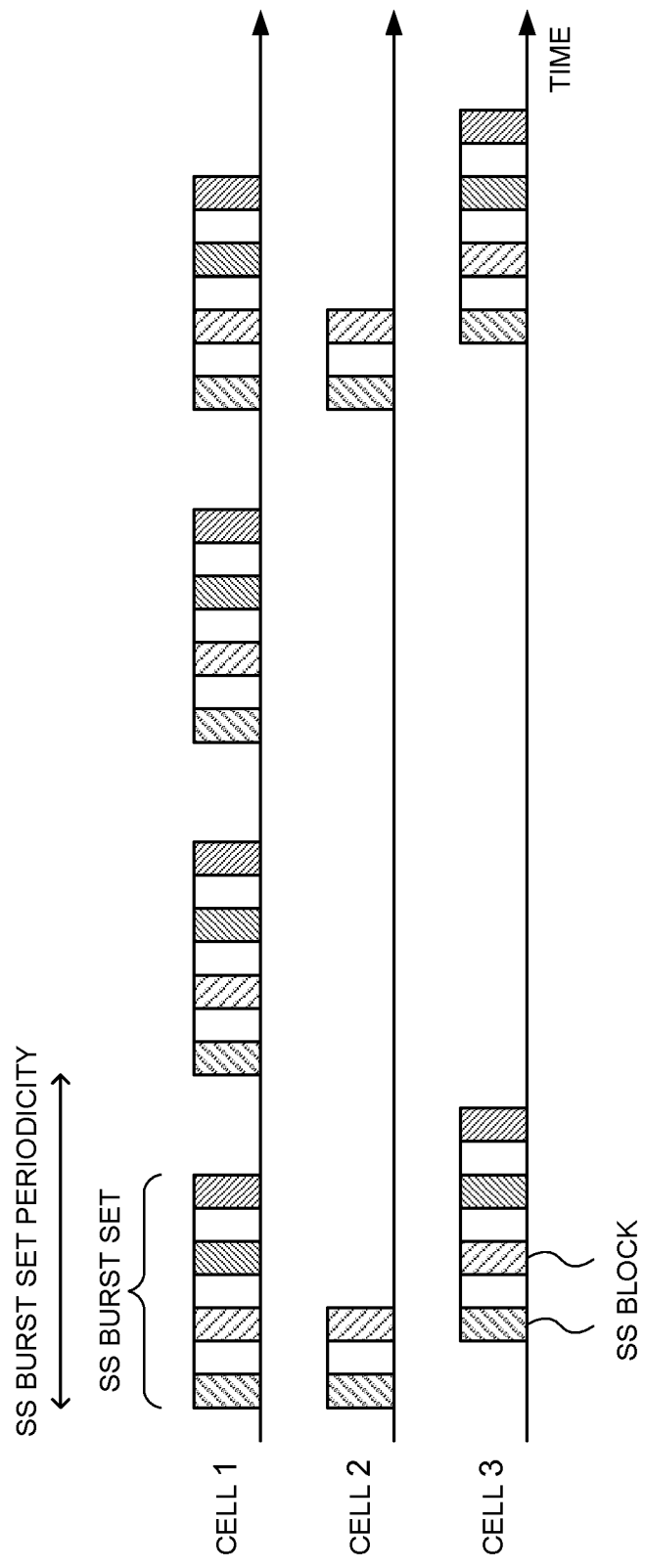

A different cell on the same carrier frequency may have at least one of a different SS burst set periodicity, a different SS burst set timing, and a different set (number) of SS blocks to be actually transmitted. In a cell A, a cell B and a cell C illustrated in FIG. 10A, an SS burst set periodicity may differ between the cell A, and the cell B or C as illustrated in FIG. 10B. Furthermore, an SS burst set timing may differ between the cell B and the cell C. Furthermore, a set (number) of SS blocks to be actually transmitted may differ between the cell B and the cell A or C.

(Radio Communication System)

The configuration of the radio communication system according to one embodiment of the present invention will be described below. This radio communication system uses one or a combination of the radio communication method according to each of the above embodiments of the present invention to perform communication.

Figure 11:
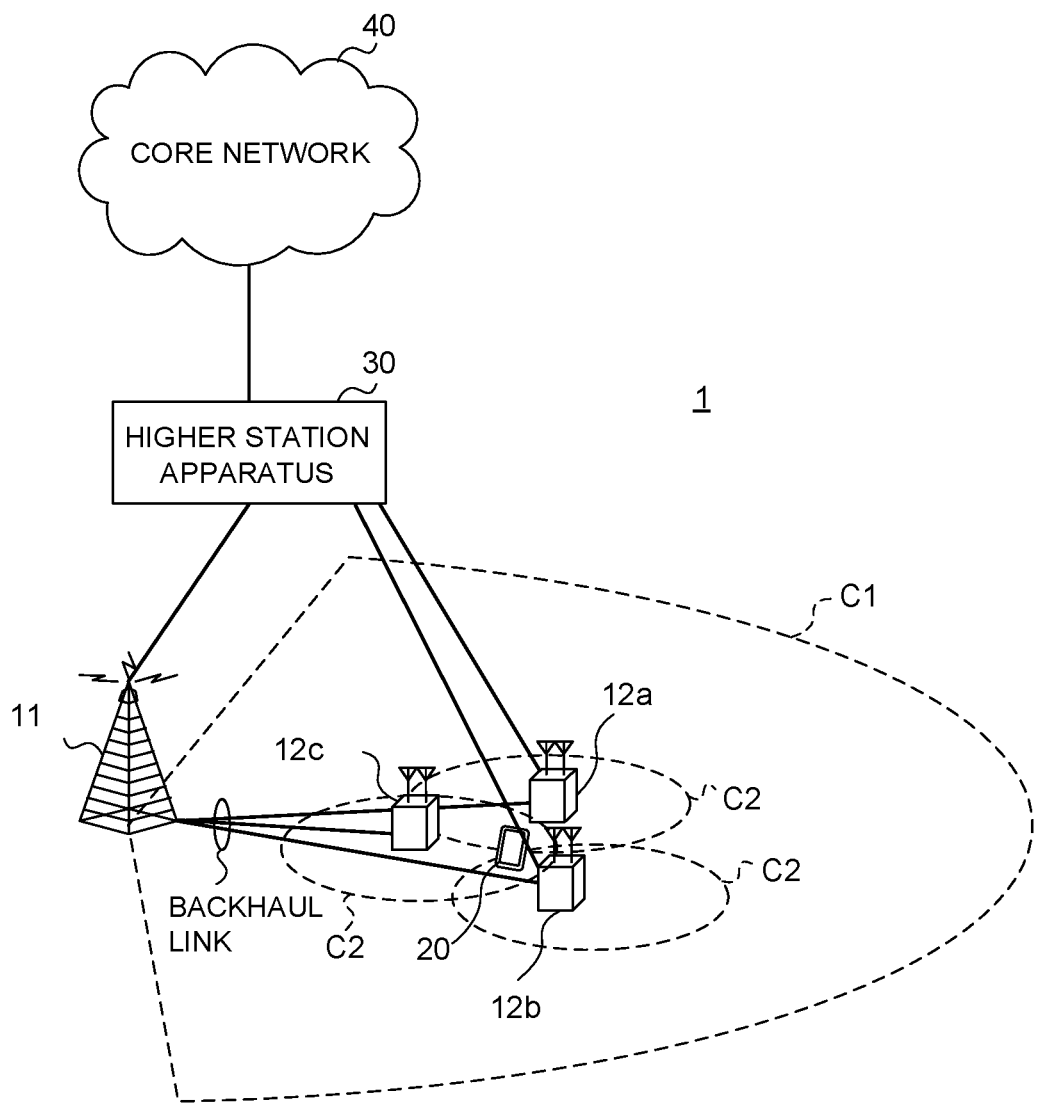
FIG. 11 is a diagram illustrating one example of a schematic configuration of a radio communication system according to one embodiment of the present invention.

FIG. 11 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to those illustrated in FIG. 11.

The user terminal 20 can connect with both of the radio base station 11 and the radio base stations 12. The user terminal 20 is assumed to concurrently use the macro cell C1 and the small cells C2 by CA or DC. Furthermore, the user terminal 20 may apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink, and applies Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band of one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, scheduling information may be notified by DCI. For example, DCI for scheduling DL data reception may be referred to as a DL assignment, and DCI for scheduling UL data transmission may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARD) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 12:
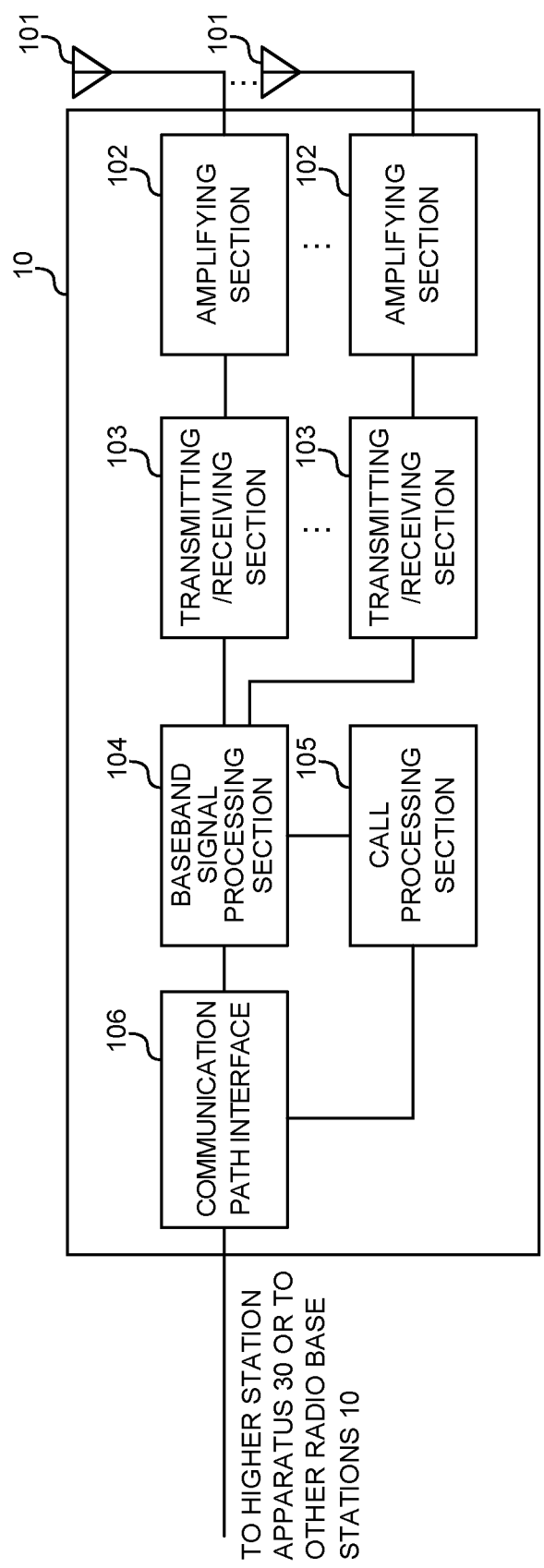
FIG. 12 is a diagram illustrating one example of an overall configuration of a radio base station according to the one embodiment of the present invention.

FIG. 12 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmission/reception section 103 may transmit a given signal (e.g., an NR-SSS, or an NR-SSS and an NR-PBCH DMRS) in one or more synchronization signal blocks (e.g., SS blocks).

Figure 13:
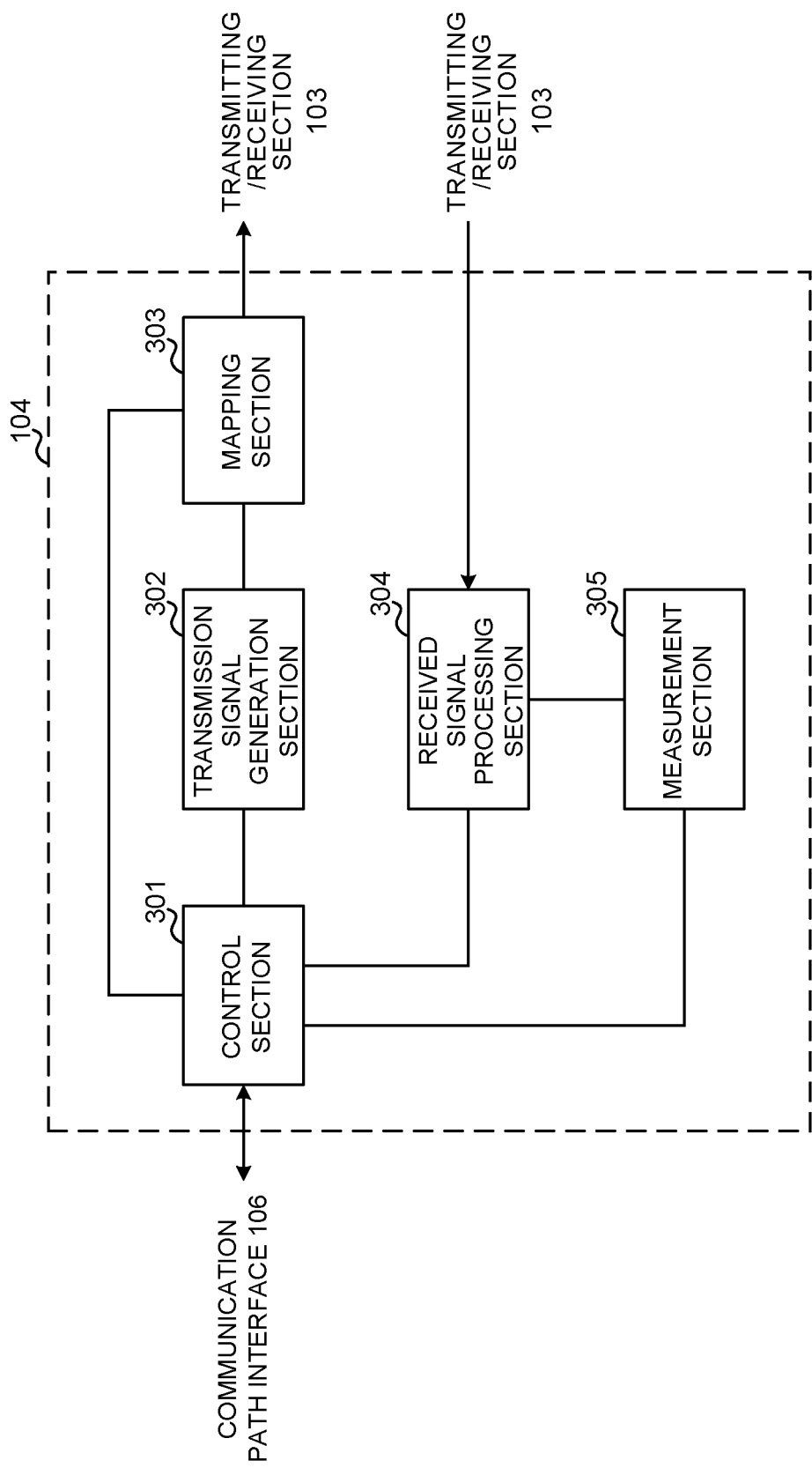
FIG. 13 is a diagram illustrating one example of a function configuration of the radio base station according to the one embodiment of the present invention.

FIG. 13 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., Received Signal Strength Indicator (RSSI)) or channel information (e.g., CSI). The measurement section 305 may output a measurement result to the control section 301.

(User Terminal)

Figure 14:
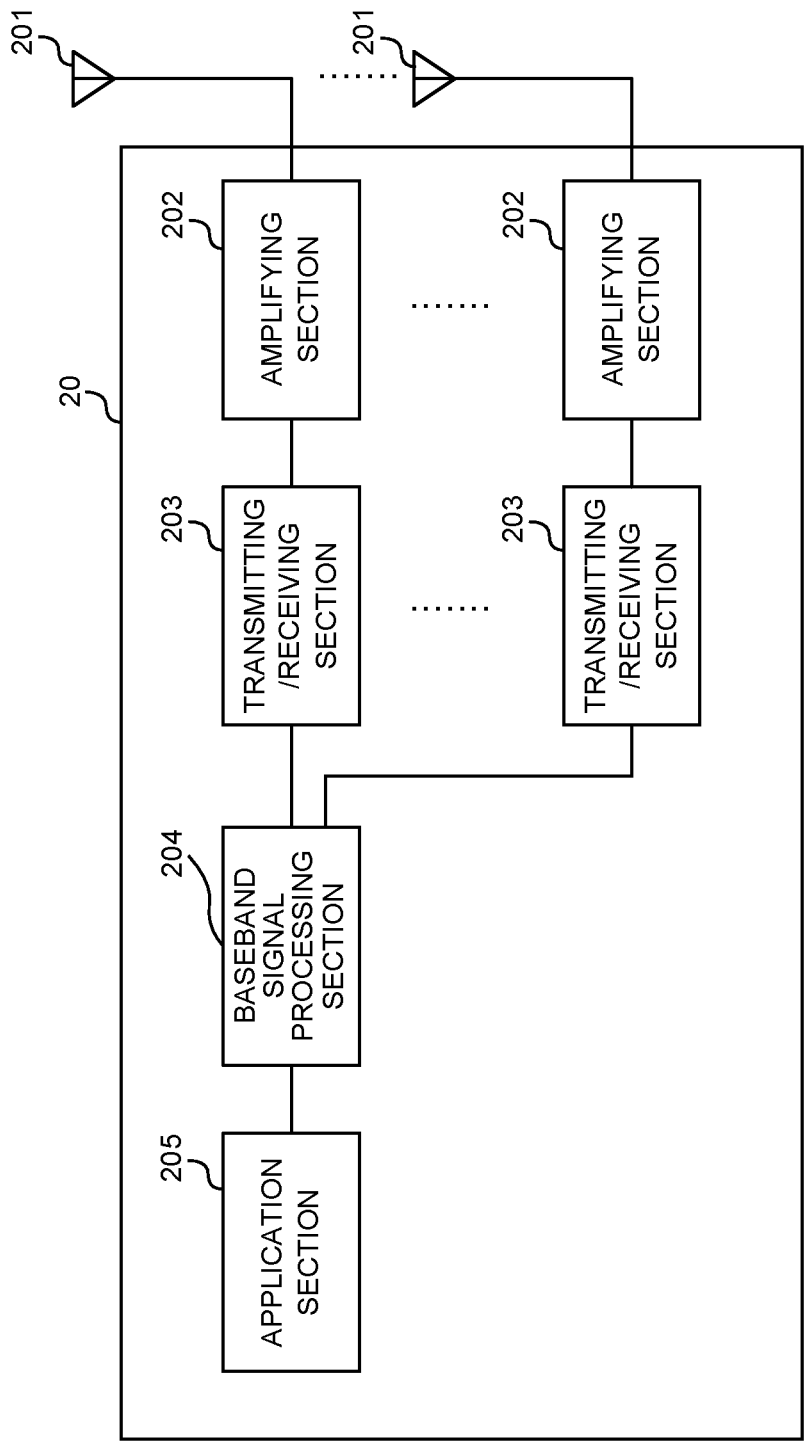
FIG. 14 is a diagram illustrating one example of an overall configuration of a user terminal according to the one embodiment of the present invention.

FIG. 14 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 may receive a given signal (e.g., an NR-SSS, or an NR-SSS and an NR-PBCH DMRS) in one or more synchronization signal blocks (e.g., SS blocks).

Furthermore, each transmission/reception section 203 may transmit to the radio base station a report including at least one of first received power (e.g., beam level RSRP and/or cell level RSRP), second received power (e.g., beam level reception strength and/or cell level reception strength), and received quality (e.g., beam level received quality and/or cell level received quality).

Figure 15:
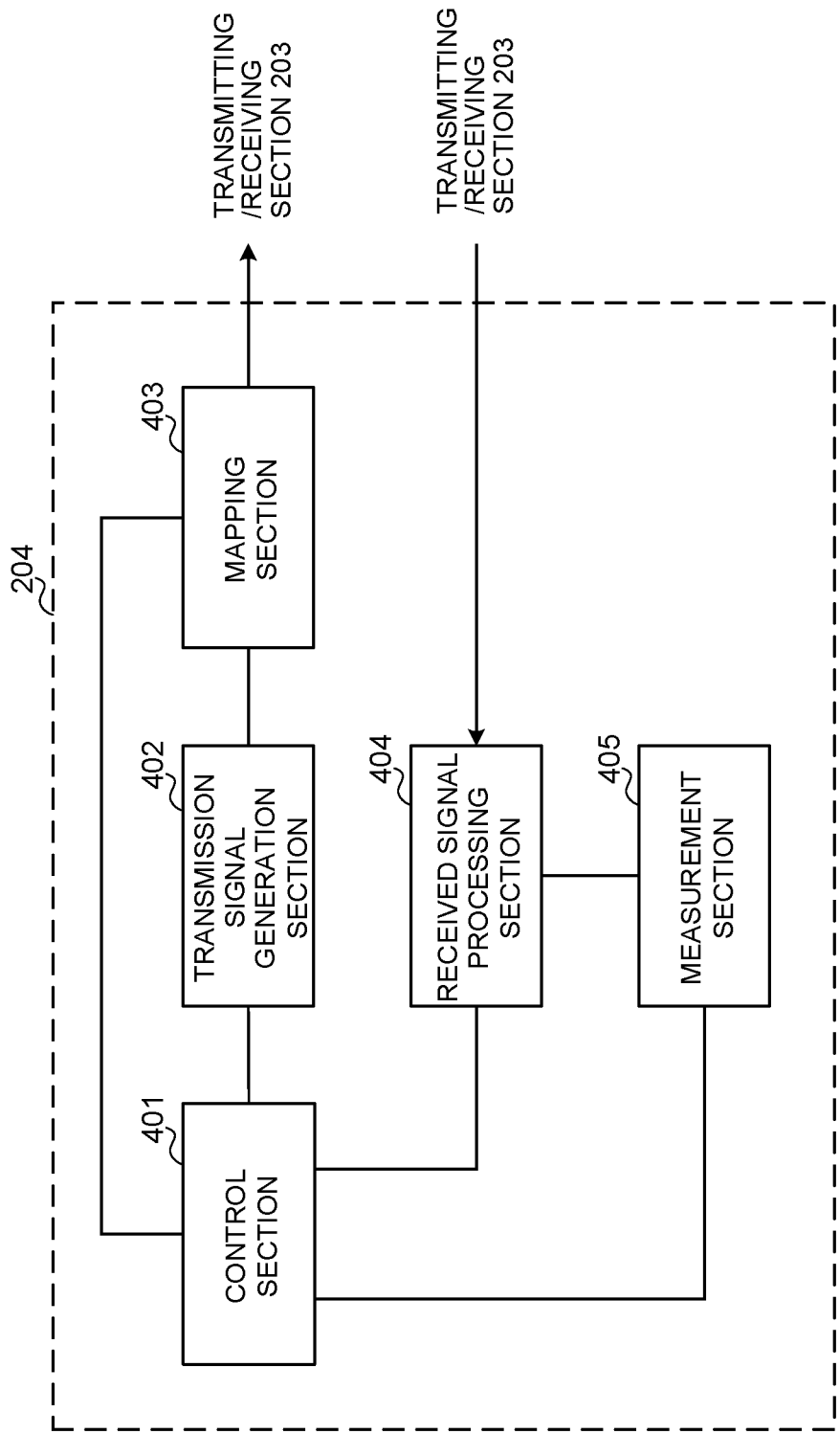
FIG. 15 is a diagram illustrating one example of a function configuration of the user terminal according to the one embodiment of the present invention.

FIG. 15 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

When obtaining from the received signal processing section 404 various pieces of information notified from the radio base station 10, the control section 401 may update a parameter used for control based on these pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401.

Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

Furthermore, the measurement section 405 may measure first received power of a given signal (e.g., beam level RSRP or cell level RSRP), and second received power of a radio resource (e.g., beam level reception strength or cell level reception strength) associated with one or more synchronization signal blocks. Furthermore, the measurement section 405 may derive cell received quality (e.g., beam level received quality or cell level received quality) based on the first received power and the second received power.

Furthermore, the measurement section 405 may measure the first received power (e.g., beam level RSRP) of each synchronization signal block, measure the second received power (e.g., beam level reception strength) of a radio resource associated with each synchronization signal block, and derive received quality (e.g., beam level received quality) corresponding to each synchronization signal block based on the first received power corresponding to each synchronization signal block and the second received power corresponding to each synchronization signal block. The reception strength may be an RSSI and the received quality may be RSRQ or the reception strength may be noise plus an interference and the received quality may be an SINR.

Furthermore, the measurement section 405 may derive cell received quality (e.g., cell level received quality) based on received quality (e.g., beam level received quality) corresponding to each synchronization signal block.

Furthermore, the radio resource may be one of at least part of a resource of a corresponding synchronization signal block, a resource including at least part of the resource of the corresponding synchronization signal block and having a bandwidth notified from the radio base station, a resource indicated by broadcast information (e.g., MIB) in the corresponding synchronization signal block, and a resource notified from the radio base station. The notification from the radio base station may be an SIB in an idle mode or RRC signaling in a connection mode.

Furthermore, the measurement section 405 may measure the first received power corresponding to a specific synchronization signal block by using a plurality of received beams, and measure the second received power corresponding to a specific synchronization signal block by using a received beam corresponding to the highest first received power.

Furthermore, the measurement section 405 may derive the second received power of a cell (e.g., cell level reception strength) based on the second received power (e.g., beam level reception strength) corresponding to each synchronization signal block.

Furthermore, the radio resource is a resource notified from the radio base station, and the measurement section 405 may measure the second received power of the cell (e.g., cell level reception strength) of the radio resource.

Furthermore, the measurement section 405 may measure the second received power of the cell (e.g., cell level reception strength) by using a plurality of different received beams.

Furthermore, the measurement section 405 may derive the cell received quality (e.g., cell level received quality) based on the first received power (e.g., beam level RSRP) corresponding to each synchronization signal block, and the second received power of the cell (e.g., cell level reception strength). Furthermore, the measurement section 405 may derive the cell received quality (e.g., cell level received quality) based on the first received power of the cell (e.g., cell level RSRP) and the second received power (e.g., beam level reception strength) corresponding to each synchronization signal block.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by way of, for example, wired connection and/or radio connection).

Figure 16:
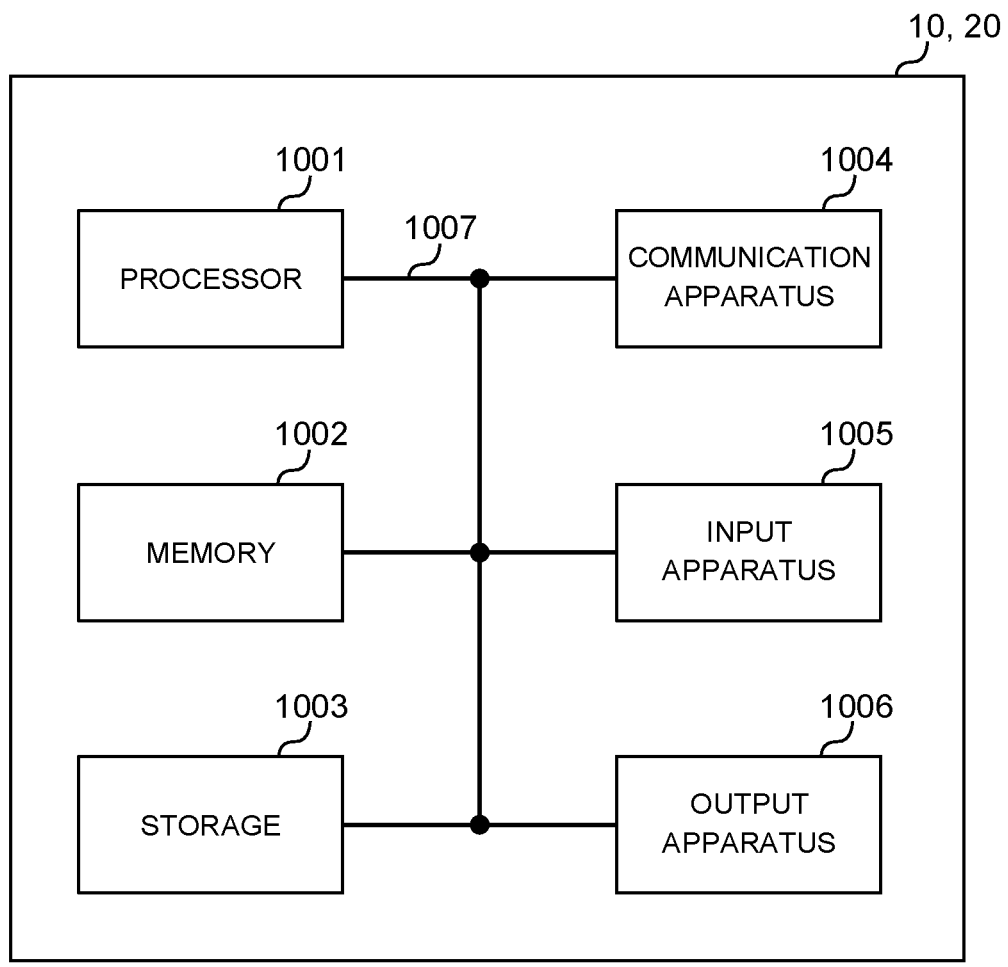
FIG. 16 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 16 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 16 or may be configured without including part of the apparatuses.

For example, FIG. 16 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

MODIFIED EXAMPLE

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a sub slot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed by one bit, may be made based on a boolean expressed by true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus and a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
a receiver that measures a first received power in a first resource of a synchronization signal per synchronization signal block index in a cell, and measures a second received power in a second resource; and
a processor that derives a measurement result based on a ratio of the first received power to the second received power per the synchronization signal block index,
wherein the processor derives a plurality of measurement results by deriving the measurement result per the synchronization signal block index, and derives a result of measurement for the cell as an average of upper values exceeding a threshold value out of the plurality of measurement results, and
wherein a number of values used in the average does not exceed a specified number.

2. The terminal according to claim 1, wherein the synchronization signal block index is associated with a measured beam.

3. The terminal according to claim 1, wherein the processor reports at least one of the first received power and the measurement result.

4. The terminal according to claim 1, wherein the processor is configured, by Radio Resource Control (RRC) signaling, with a periodicity, an offset and a time duration of the second resource.

5. The terminal according to claim 1, wherein the measurement of the first received power and the measurement of the second received power is based on a received beam.

6. The terminal according to claim 1, wherein the receiver measures the second received power per the synchronization signal block index.

7. The terminal according to claim 1,
wherein the processor derives the measurement result by dividing N times the first received power by the second received power,
wherein N is a number of resource blocks in a measurement bandwidth of the second received power.

8. The terminal according to claim 1, wherein a bandwidth of the second resource is equal to a bandwidth of the first resource, the processor derives the measurement result by dividing the first received power by the second received power, and the measurement result is a signal-to-noise and interference ratio.

9. A radio communication method for a terminal comprising:
measuring a first received power in a first resource of a synchronization signal per synchronization signal block index in a cell, and measuring a second received power in a second resource; and
deriving a measurement result based on a ratio of the first received power to the second received power per the synchronization signal block index,
wherein the terminal derives a plurality of measurement results by deriving the measurement result per the synchronization signal block index, and derives a result of measurement for the cell as an average of upper values exceeding a threshold value out of the plurality of measurement results, and
wherein a number of values used in the average does not exceed a specified number.

10. The terminal according to claim 2, wherein the processor reports at least one of the first received power and the measurement result.

11. The terminal according to claim 2, wherein the processor is configured, by Radio Resource Control (RRC) signaling, with a periodicity, an offset and a time duration of the second resource.

12. The terminal according to claim 3, wherein the processor is configured, by Radio Resource Control (RRC) signaling, with a periodicity, an offset and a time duration of the second resource.

13. The terminal according to claim 2, wherein the measurement of the first received power and the measurement of the second received power is based on a received beam.

14. The terminal according to claim 3, wherein the measurement of the first received power and the measurement of the second received power is based on a received beam.

15. The terminal according to claim 4, wherein the measurement of the first received power and the measurement of the second received power is based on a received beam.

16. A system comprising:
a terminal that comprises:
- a receiver that measures a first received power in a first resource of a synchronization signal per synchronization signal block index in a cell, and measures a second received power in a second resource; and
- a processor that derives a measurement result based on a ratio of the first received power to the second received power per the synchronization signal block index; and a base station that transmits the synchronization signal per synchronization signal block index in the cell, wherein the processor derives a plurality of measurement results by deriving the measurement result per the synchronization signal block index, and derives a result of measurement for the cell as an average of upper values exceeding a threshold value out of the plurality of measurement results, and wherein a number of values used in the average does not exceed a specified number.

* * * * *